United States Patent Office 3,278,891
Patented Oct. 11, 1966

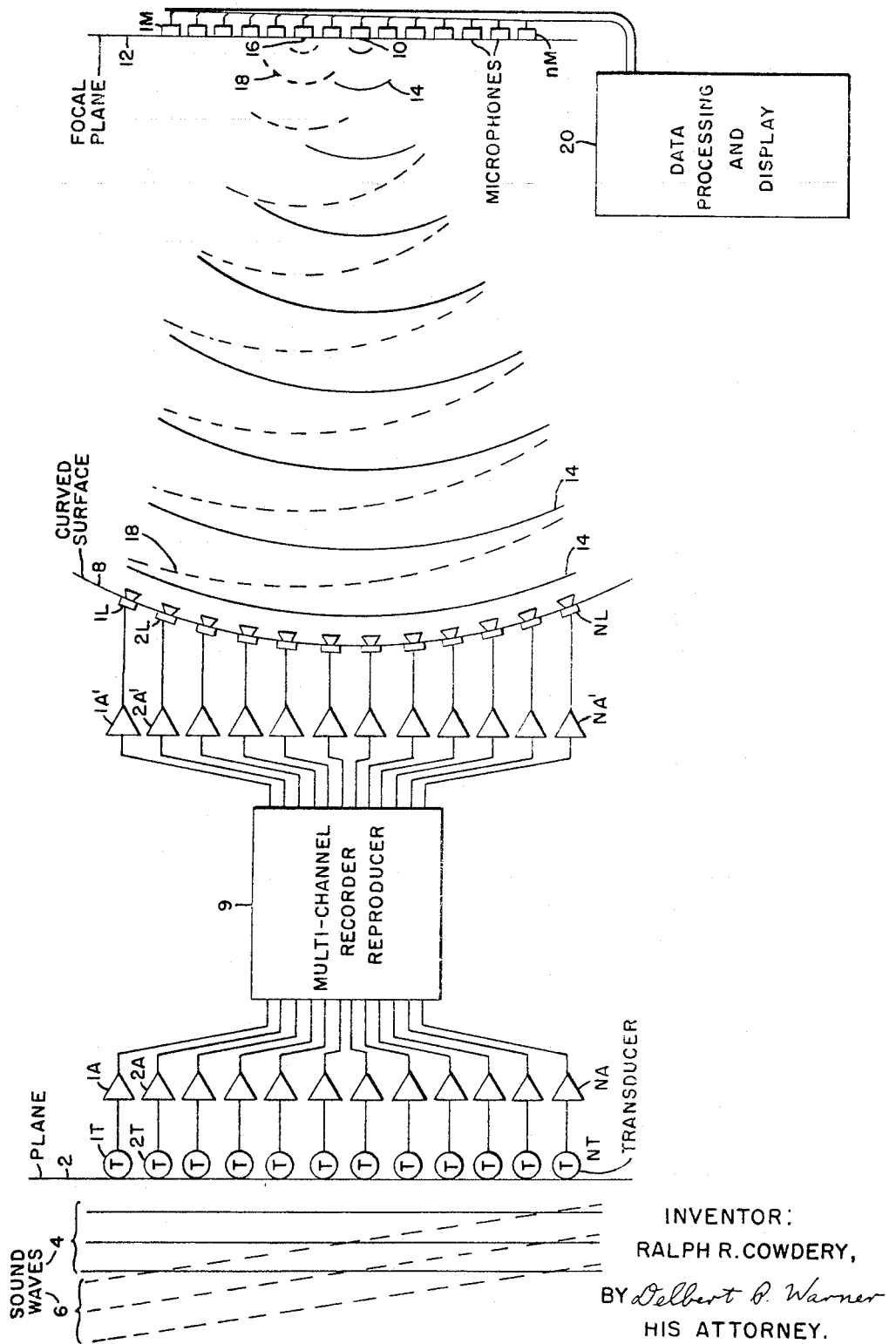

3,278,891
SONAR RECEIVER PROCESSING EQUIPMENT
Ralph R. Cowdery, Baldwinsville, N.Y., assignor to General Electric Company, a corporation of New York
Filed Nov. 27, 1961, Ser. No. 155,007
9 Claims. (Cl. 340—6)

This invention relates to sonar receiving equipment and in particular it relates to improved sonar signal processing equipment for use with mechanically fixed sensor arrays and to the processing of signals coming from such arrays.

The prior art pertaining to sonar receiving equipment pertains to equipment which can be catalogued as of two types—the first is mechanical scanning equipment which uses rotatable transducers to scan (receive) and the second is non-mechanical scanning equipment in which the transducer is fixed and scanning is done by electrical means. The present invention pertains primarily, but not exclusively, to sonar receivers of the second type with mechanically fixed transducers and to the resolution of certain problems pertaining to such equipment.

Among the approaches which have been employed with fixed arrays or transducers is one set forth in detail in the co-pending application of Pierre H. Boucheron, patent application No. 155,009, filed on November 27, 1961, now Patent No. 3,239,799, assigned to the same assignee as the present invention, and entitled "Sonar Directional Beam Forming System." In this co-pending application of Mr. Boucheron's, incoming sonar wave fronts are sensed by hydrophones arrayed in a plane or a curved surface and the resulting electrical signals are used to energize loudspeakers. The loudspeakers, in turn, are arrayed in a three-dimensional curve about a focal point in a focal plane or other focusing surface so that they will all focus sound at a focal point or elsewhere on the focusing surface. The actual point at which each wave front is focused will depend upon the direction from which the original wave fronts came, or more directly upon the phase relationships which were introduced into the system by those wave fronts. The signals focused on the focal surface are used to activate a plurality of microphones which then provide signals to data processing and display equipment. It will be seen that the system is roughly analogous in function to an optical lens focusing on light sensitive transducers.

The principal drawback to the invention set out in the last paragraph stems from the requirement that the equipment be of large size in many instances. This is particularly true where very large arrays of hydrophones are needed for directional accuracy in long range sonar with its relatively long transmission waves. The transducers in such cases may be hundreds or even thousands of feet in extent which calls for a loudspeaker and microphone system which would be of truly monumental proportions.

It is a primary object, therefore, of this invention to provide an improved acoustical system for use in sonar signal processing in which the size of the system need not be limited strictly by considerations of the size of the received wave forms.

It is a further object of this invention to provide for the reduction in the physical size of an acoustical system while maintaining the phase relationships of signals being processed.

Briefly stated, in accordance with one aspect of the invention, a planar array of hydrophone sensors, or array of hydrophone sensors in a plane, is provided to receive sound from a plurality of directions. The hydrophones are each coupled through a separate amplifier to provide electrical signals suitable to be recorded on magnetic tapes, thermoplastic tapes, magnetic drums or other recording media of a multi-channel recorder. The recording of the signals from the hydrophone is made with the recorder operating at a selected conventional speed. During play back of the recorded signals, however, the play back mechanism is operated at a greater speed, perhaps a hundred times the record speed, to provide new signals having much shorter wave lengths, but with the phase relationships of the original waves preserved intact. These new signals are then used in a reproduction system consisting of a plurality of loudspeakers directed to focus new sound waves, generated from the new signals, into an image. Since the new sound waves are of much shorter wave length than the original sound waves, the size of the equipment being used for reproduction of the sound waves may be much smaller than was the receiving equipment, perhaps 1/100 as large and conceivable smaller.

The features of this invention which are believed to be novel are set forth with particularity in the appended claims. The invention itself, however, both as to its organization and its method of operation, together with further objects and advantages thereof, may best be understood by reference to the following description taken in connection with the accompanying drawing in which the single figure is a schematic diagram of an embodiment of the invention.

Turning to the embodiment of the invention illustrated in the figure, we find an array of transducers T which are labeled 1T, 2T . . . NT, where N is the total number of transducers. The transducers 1T–NT are shown in the figure to be arrayed beside a line where the line represents the intersection between a plane 2 and the surface of the paper, but may actually stand for a curved surface. The transducers illustrated in FIG. 1 represent only one column or one row of a plurality of such rows and columns of transducers arrayed with their receiving elements located in the plane 2. To the left of the plane 2 in FIG. 1 is shown a plurality of straight lines 4 which are parallel to the intersection of the paper and the plane. These lines represent the wave front of a sound wave which is incident parallel to the plane in which the transducers are located. This means that the objects from which the wave front 4 originated are located, ideally, somewhere along a line perpendicular to the plane 2 and running through the center of the transducer array. Another plurality of lines, designated by the dashed lines 6, are shown to the left of the plane 2 of the figure to represent the wave front of a sound wave which approaches the plane 2 from such an angle that the wave front will strike the transducer array at an acute angle.

The difference in the effect produced by wave fronts such as 4 and 6 will now be made apparent. All parts of the wave front 4 will strike the transducers at the same time, assuming of course that the transducers are all located with their receiving elements in the same plane 2 and that the approaching wave front is substantially plane like. Neither of these conditions may be realized completely in practice, but they both may be realized to a sufficient degree for the purpose of this invention and it may be desirable or necessary to have a curved surface instead of a plane 2 which will call for some adjustment in the shape of the received wave front. The effect of having the face of the wave front 4 strike all the transducers simultaneously is to excite the transducers so that their outputs to the amplifiers 1A, 2A . . . NA will be substantially all in phase. The effect of a wave front such as 6, which strikes the plane 2 at an acute angle, is to produce signals in the transducers 1T–NT which differ in phase and are transmitted to the amplifiers 1A–NA where signals will be amplified and transmitted to the multi-channel recorder-reproducer 9.

The multi-channel recorder and reproducer referred to in the last paragraph, and indicated in the figure as block 9, may be any multi-channel recorder and reproducer capable of recording the required number of channels simultaneously and of playing those signals back, or reproducing them, at a different rate than they were recorded. Ideally, this recording-reproducing equipment will record continuous wave forms and play them back without introducing any distortion. In practice, it is possible with existing multi-channel tape recorders or with recorders employing thermo-plastics to record the original signals and to play them back at greatly increased speeds, while preserving the phase relationships which existed between the original wave forms.

The primary purpose in introducing the multi-channel recorder and reproducer 9 between the receiving portion of the circuits to the left block 9 in the figure and the utilization circuits to the right of block 9 in the figure is to make it possible to reduce the size of the utilization circuits. As previously indicated, wave forms such as 4 and 6 which are received by long range sonar equipment are of relatively low frequency, perhaps only 300 cycles per second. Such low frequency waves in a medium such as water, where the velocity of propagation may be taken as around 5,000 feet per second, are necessarily relatively long waves $$\left(\frac{5000}{300} = 16.6 \text{ ft.}\right)$$

calling for very large arrays of transducers 1T–NT. The rate of propagation of sound in air is only about ⅕ that in water, so that waves 16.6 ft. long in water would be only 3.3 ft. long in air. This reduction in wavelength is advantageous in a system, such as the present one, in which the signals are to be reproduced in air. However, the waves are still relatively long and in order to faithfully reproduce them it has been found necessary to use large speaker systems. With the reduction in wave lengths possible with the present invention the speakers and attendant equipment may be greatly reduced in size.

From the recorder-reproducer 9, the new wave forms are transmitted to amplifiers 1A′–NA′ where they are increased in strength sufficiently to drive the loudspeakers 1L–NL. The loudspeakers 1L through NL are arrayed in such a way that their voice coils or emitting elements are located substantially in the curved surface 8, which has a focal point at 10. It will be appreciated that this curved surface is three-dimensional and may be a portion of a sphere, of a paraboloid, or other solid curve having a focal center at a point such as 10.

In the operation of the invention, the wave fronts will be received by the transducers 1T–NT, which may be hydrophones, and be converted into electrical signals which will then be received and amplified by the amplifiers 1A through NA. The amplifiers will transmit the signals through the recorder-reproducer 9 to other amplifiers 1A′–NA′ and to loudspeakers 1L–NL which in turn will reproduce the portion of the sound wave received by the corresponding transducer, but at a higher frequency. The loudspeakers are located with respect to the curved surface 8 in such a way that they will change the direction of the portion of sound received by their corresponding transducers and tend to focus the sound on some point on the focal surface 12.

In a situation in which an incident wave front is parallel to the plane 2, as wave 4 is shown to be, the output of the loudspeakers will be directed toward the focal point 10 of the curve. The lines 14 are drawn to indicate the general way in which the wave fronts will move to focus at the focal point 10. In cases where the wave front approaches the transducers at an angle, as for example the wave front 6, the signals received by the transducers will be out of phase and the out of phase signals will be translated through the amplifiers to the corresponding loudspeakers so that the new wave front formed by the loudspeakers will have a focal point such as 16. A wave front might be formed by the loudspeakers, from signals having their origin in an initial wave front such as 6, along dashed lines 18, where the dashed lines are intended merely to show the general way in which the waves will converge on some focal point 16.

The wave fronts focused at various focal points such as 10 and 16 represent all the energy, concentrated at a single point, which comes from an object or objects located in very narrow sectors extending out into space from the face of the transducers. In the case of a small target, or else one located at a great distance, the reflected sound may all be concentrated by this invention at a single focal point such as 10 or 16. In the case of a larger object, or a small object located near at hand, the energy reflected from various parts of the object may be concentrated by the invention on two or more focal points in the focal plane. In the latter case a multi-element image of the object will actually be formed with the resolution of the image being dependent on the number of separate focal points which are distinguishable.

In order to effectively use the sound energy concentrated on the various focal points in the focal plane it is necessary to have a plurality of microphones which are designated in the figure as 1M through $n$M, where "$n$" represents the total number of microphones used and may be a number much larger than the "N" designating the number of transducers, amplifiers and loudspeakers. It will be appreciated that the number of microphones "$n$" will determine the resolving power of the system to a very large degree, since there must be a separate microphone for each discrete resolvable beam position which it is desired to consider. In order to make use of the signals impinging upon the microphones, the electrical outputs of the microphones must be utilized in some sort of display device or other means of conveying information derived from sonar devices. Such data processing or display equipment may be of conventional design and is merely indicated by the block 20.

It was noted in an earlier paragraph that the transducers or hydrophones T might not always be arrayed in a perfect plane or in the desired curve, and in fact that this is not likely to be the case. This is a relatively simple condition to correct, since any misalignment may be compensated for by changes in the positions of the loudspeakers L or by providing adjustable delay circuits in the amplifiers A. Some need for making such adjustments may be necessary when the invention is operated with all its transducers under water and one or the other of them becomes misaligned due to vibrations, collision or the like.

What I claim as new and desire to secure by Letters Patent of tthe United States is:

1. In a sonar receiver, means for receiving a sound wave and converting it to electrical signals, multi-channel recording means connected for recording said signals and for playing back said signals at an increased speed to provide new electrical signals of shorter wave length, and means for converting said new electrical signals to new sound waves directed to focus in an image on a suitable surface.

2. Apparatus for focusing sound waves comprising for receiving each of several components of sound waves from a variety of sources and converting them to electrical signals multi-channel recording means connected for recording each of said electrical signals and for reproducing said signals at a faster speed to provide new electrical signals of shorter wave length, and means arranged in a curve about a focal point to receive said new electrical signals and to convert them to new sound waves, said last named means launching the new sound waves in directions to form images near said focal point.

3. Apparatus for focusing sound waves comprising means for receiving each of several components of sound waves from a variety of sources and converting them to electrical signals, multi-channel recording means connected for recording said electrical signals and for reproducing said recorded signals at an increased speed to provide new electrical signals of shorter wave length, and means arranged to receive said new electrical signals and reconvert them to sound, said last named means being arranged in a curve about a focal point to launch the sound waves in a direction to form images near said focal point.

4. Apparatus for focusing sound waves on a focusing surface comprising means for receiving each of several components of sound waves from a variety of sources and converting them to electrical signals, multi-channel recording means connected for recording said electrical signals at one speed and for playing them back at another speed to provide new electrical signals, and means arranged in a curve about a focal point in said focal plane to receive said new electrical signals and reconvert them to sound, whereby said latter means launches the sound waves in a direction to form images at points on said focal surface.

5. In a sonar receiver an array of transducers arranged substantially in a plane to receive planar wave forms from a variety of directions and to convert said wave forms to electrical signals, means for amplifying the electrical signals from each of said transducers, multi-channel recording means connected for recording said signals and for playing back said signals to provide new electrical signals of shorter wave length, second transducer means arranged along a curved surface for converting said new electrical signals to sound waves, said arrangement along a curved surface serving to focus said sound waves on a plane comprising a plurality of focal points, and means at said focal points for receiving said focused sound waves and converting them to usable electrical signals.

6. In a sonar receiver an array of transducers arranged substantially in a plane to receive planar wave forms from a variety of directions and to convert said wave forms to electrical signals, means for amplifying the electrical signals from each of said transducers, means for recording said electrical signals at a preselected rate, means for playing back said recording at an increased rate to produce new electrical signals of shortened wave length, and second transducer means for converting said new electrical signals to sound waves, said second transducer means being arranged along a surface to focus said sound waves at a plurality of focal points.

7. In a sonar receiver an array of hydrophones arranged substantially in a plane to receive planar wave forms from a variety of directions and to convert said wave forms to electrical signals, means for amplifying the electrical signals from each of said hydrophones, means for recording said electrical signals at a preselected rate, means for playing back said recording at an increased rate to produce new electrical signals of shortened wave length, loudspeakers arrayed along a curved surface to convert said new electrical signals to sound waves and to focus said sound waves at a plurality of focal points, and microphones at said focal points for receiving said focused sound waves and converting them to usable electrical signals.

8. A sonar directional beam former comprising a plurality of hydrophones arrayed substantially in a plane to receive sound waves and convert them to electrical signals, a multi-channel recorder for receiving and recording said electrical signals and for playing back said recording at an increased speed to provide new electrical signals, a plurality of loudspeakers arrayed in a curve having a focal point, said focal point lying in a focal plane, said loudspeakers receiving said new electrical signals and transmitting new sound waves proportional thereto, and a plurality of microphones arrayed in said focal plane to receive said new sound waves and convert them to useful signals.

9. A sonar directional beam former comprising a plurality of transducers arrayed substantially in a plane to receive sound waves and convert them to electrical signals, multi-channel recording means connected to record said electrical signals and replay said electrical signals at an increased speed to provide new electrical signals of shorter wave length, a plurality of loudspeakers arrayed in a curve having a focal point, said focal point forming one focusing area in an array of individual focusing areas, said loudspeakers receiving said electrical signals and transmitting new sound waves proportional thereto, and a second plurality of transducers arrayed so that one transducer is located in each of said focusing areas to receive said new sound waves and convert them to useful signals.

References Cited by the Examiner

UNITED STATES PATENTS

| | | | |
|---|---|---|---|
| 2,455,475 | 12/1948 | Eilenberger | 340—6 |
| 2,573,748 | 11/1951 | Weinstein et al. | 340—16 |
| 2,898,589 | 8/1959 | Abbott | 340—6 |
| 2,987,068 | 6/1961 | Branson | 340—3 |

CHESTER L. JUSTUS, *Primary Examiner.*

R. A. FARLEY, *Assistant Examiner.*